Feb. 11, 1941.                E. WILCOX                2,231,354
                     VARIABLE STRIPPING TEETH
                     Filed March 19, 1940     2 Sheets-Sheet 1
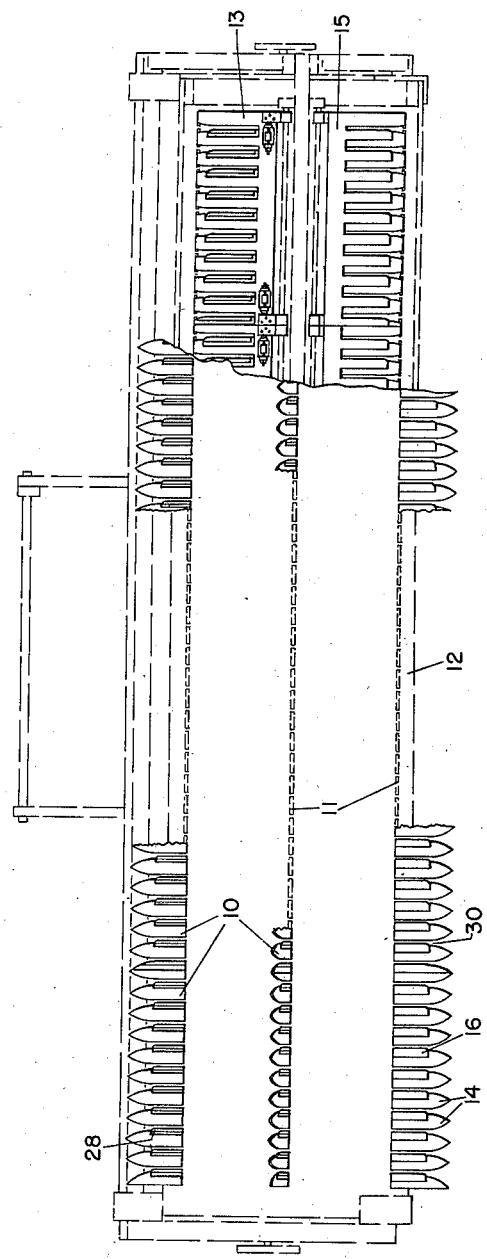
Inventor
Everett Wilcox
per
Attorneys Feb. 11, 1941.　　　　E. WILCOX　　　　2,231,354
VARIABLE STRIPPING TEETH
Filed March 19, 1940　　　2 Sheets-Sheet 2
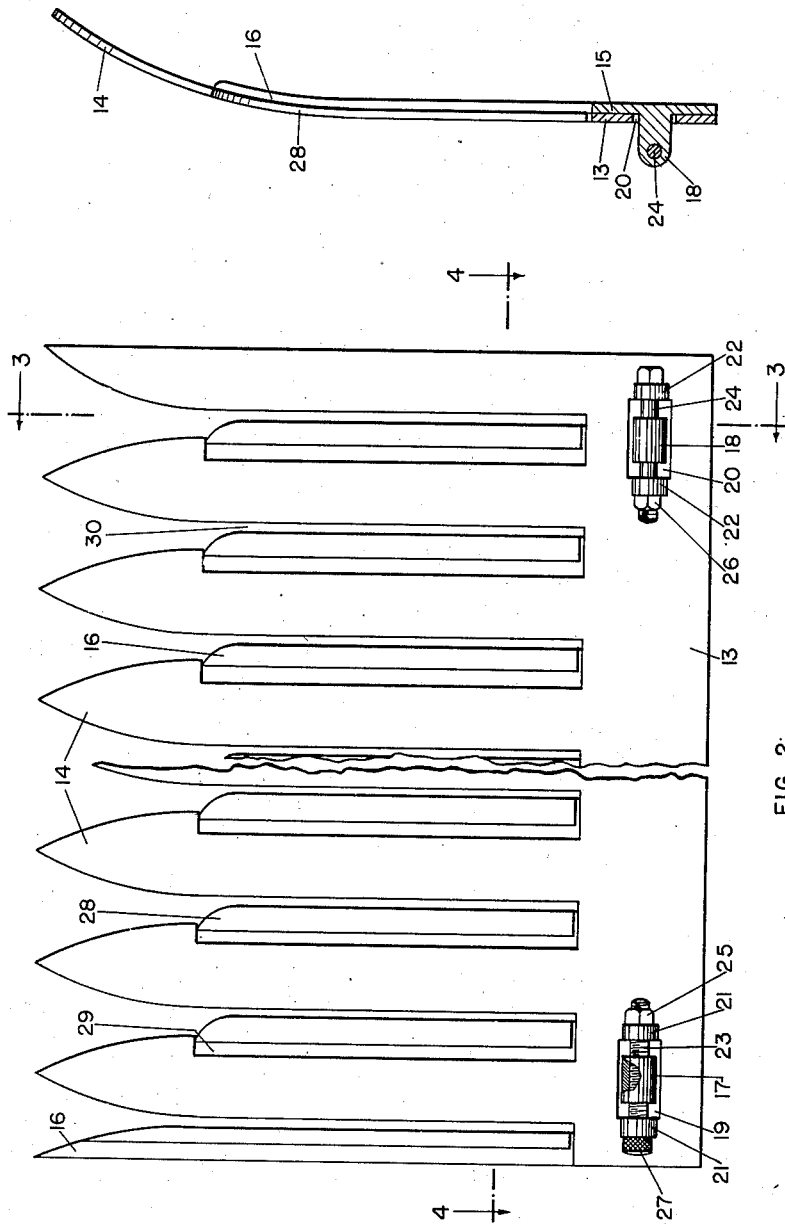
Inventor
Everett Wilcox
per
Attorneys Patented Feb. 11, 1941

2,231,354

UNITED STATES PATENT OFFICE 2,231,354

VARIABLE STRIPPING TEETH

Everett Wilcox, Hyattsville, Md.

Application March 19, 1940, Serial No. 324,800

3 Claims. (Cl. 56—130)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to grain stripping harvesters, and is concerned with the teeth thereof.

More particularly, this invention is an improvement in the teeth arrangement in the device disclosed in United States Letters Patent No. 2,152,730.

One of the objects of the invention is to permit a variation of the space between the grain stripping teeth to accommodate different sizes of grain stalk.

Another object of this invention is to obviate the necessity of replacing teeth, which have become worn, by making a simple adjustment to compensate for the wear.

The following description, considered together with the accompanying drawings, will disclose this invention more fully, its construction, arrangments, and combinations of parts, and further objects and advantages thereof will be apparent.

In the drawings:

Figure 1 is a front view of a grain stripping harvester of the type mentioned showing an embodiment of this invention mounted thereon.

Figure 2 is a plan view of one of the comb assemblies.

Figure 3 is a section along the line 3—3 of Figure 2.

Figure 4 is a section along the line 4—4 of Figure 2.

Referring with more particularity to the drawings, in which like numerals designate like parts, the embodiment illustrated comprises a plurality of comb assemblies 10 adapted to be operatively attached to the harvester, in place of the usual rows of stripping teeth, projecting through apertures 11 of the rotatable cylinder 12. Each comb assembly comprises a sheet or plate 13 of metal, or other suitable material, which has been cut out in the form of a comb to provide a plurality of teeth 14. The teeth 14 may be arcuated as shown in Figure 3, and as suggested in the above-mentioned patent. On top of said sheet 13 another sheet or plate 15 is disposed similar to, but somewhat narrower than, the plate 13, and it is also cut out to provide a comb of teeth 16. These two plates are held together in slidable relation. Lugs 17 and 18 are fixed to the plate 15 and they project through apertures 19 and 20, respectively, in the plate 13. Pairs of brackets 21, 21 and 22, 22 are fixed to the plate 13, each pair flanking the apertures 19 and 20, respectively. Bolts 23 and 24, one for each lug, are disposed through the brackets 21, 21 and 22, 22, respectively, and their corresponding lugs 17 and 18. These bolts are held in position by means of nuts 25 and 26. One of the bolts, say bolt 23, is threaded and its corresponding lug 17 is also threaded to engage therewith. The other bolt 24 simply engages its corresponding lug 18 in a slidable relation. The head 27 of the bolt 23 is preferably knurled, or otherwise provided with an anti-friction surface, to permit manual turning. By these means the plates 13 and 15 are not only held together, but are also made longitudinally adjustable with respect to each other. The adjustment is accomplished by loosening the nut 25 of the threaded bolt 23 and turning the bolt until the desired relative position of the plates 13 and 15 is obtained.

One edge of each of the teeth 16 is flanged to provide a lip 28, projecting between adjacent teeth of the sheet 13, the thickness of the lips 28 being substantially equal to the thickness of the teeth 14. The corresponding edges of the teeth 14 are cut out to provide recesses 29 for the lips 28. The spaces 30 between the lips 28 and their respective adjacent teeth 14 are where the cereal stalks enter and are stripped of their grain. These spaces may be adjusted for different sizes of grain and to compensate for the wearing of the edges of the teeth by simply adjusting the relative longitudinal positions of the plates 13 and 15, as above described.

To prevent the blocking of any grain stalks entering between the teeth 14, for any position of the teeth 16 with respect to the teeth 14, the outer ends of the teeth 16 are tapered, or otherwise narrowed, substantially as shown.

Having thus described my invention, I claim:

1. In a grain stripping harvester, grain stripping means comprising pairs of coactable combs of fixed teeth, lugs secured to one of the combs of each pair, said lugs projecting through apertures in the other comb, brackets secured at the lateral ends of said apertures, bolts connecting said lugs and their corresponding brackets, at least one of the lugs of each pair of combs being in threaded engagement with its corresponding bolt, the other lugs being slidably mounted on their respective bolts.

2. A grain stripper having a pair of combs, the teeth of both combs being fixed, the teeth of one comb being overlapped on the teeth of the other comb so as to form a space between each tooth of one comb and a corresponding tooth of the other comb for receiving grain stalks, and means for securing said combs in different relative positions so as to vary the width of said spaces.

3. A grain stripper having a pair of combs, the teeth of both combs being fixed, the teeth of one comb being overlapped on the teeth of the other comb so as to form a space between an edge of each tooth of one comb and the opposite edge of a corresponding tooth of the other comb for receiving grain stalks, said edges being coplanar, and means for securing said combs in different relative positions so as to vary the width of said spaces.

EVERETT WILCOX.